United States Patent [19]

Miller

[11] 4,456,084

[45] Jun. 26, 1984

[54] VEHICLE LOAD MONITORING SYSTEM

[75] Inventor: Albert J. Miller, Campbell, Calif.

[73] Assignee: Atlas Electronics International, Inc., Los Gatos, Calif.

[21] Appl. No.: 380,916

[22] Filed: May 21, 1982

[51] Int. Cl.³ .................... G01G 5/06; G01G 19/10
[52] U.S. Cl. ................................... 177/141; 177/45; 177/254; 177/DIG. 3
[58] Field of Search ............... 177/141, 136, 254, 208, 177/199, 200, 25, DIG. 3, DIG. 7, 45, 50; 73/745, 146.2, 146

[56] References Cited

U.S. PATENT DOCUMENTS

| | | | |
|---|---|---|---|
| 2,482,027 | 9/1949 | Poole | 177/141 X |
| 3,613,441 | 10/1971 | Papirno | 177/208 X |
| 3,662,845 | 5/1972 | Pratt | 177/25 |
| 3,709,309 | 1/1973 | Williams | 177/DIG. 3 X |
| 4,230,196 | 10/1980 | Snead | 177/141 |

Primary Examiner—Joseph W. Hartary
Attorney, Agent, or Firm—Harris Zimmerman; Howard Cohen

[57] ABSTRACT

A system for monitoring the load carried by a vehicle includes a plurality of load cells, each extending between the load bed and the unsprung portion of the vehicle suspension. Each load cell includes an hydraulic cylinder which generates an hydraulic force corresponding to the load applied thereto. A pressure transducer is connected to the hydraulic cylinder, and the outputs of the transducers are summed and fed to an auto zeroing system. The output of this system is connected to an A/D converter, and thence to a visual display. The A/D converter output is also fed to a digital comparator which is connected to a BCD switch set to an overload level. If the load exceeds the BCD input, an overload alarm is sounded.

10 Claims, 3 Drawing Figures

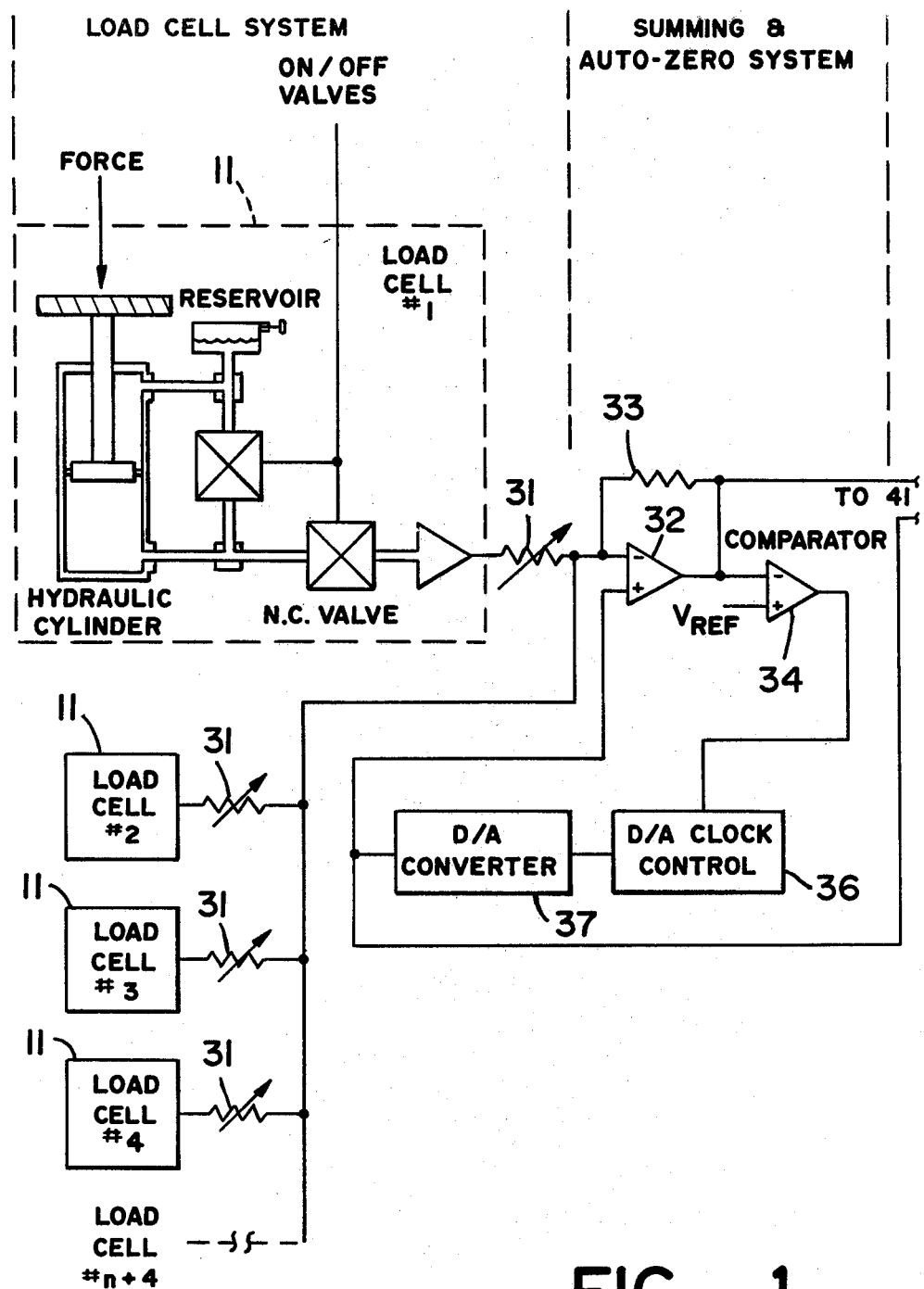
FIG _ 1

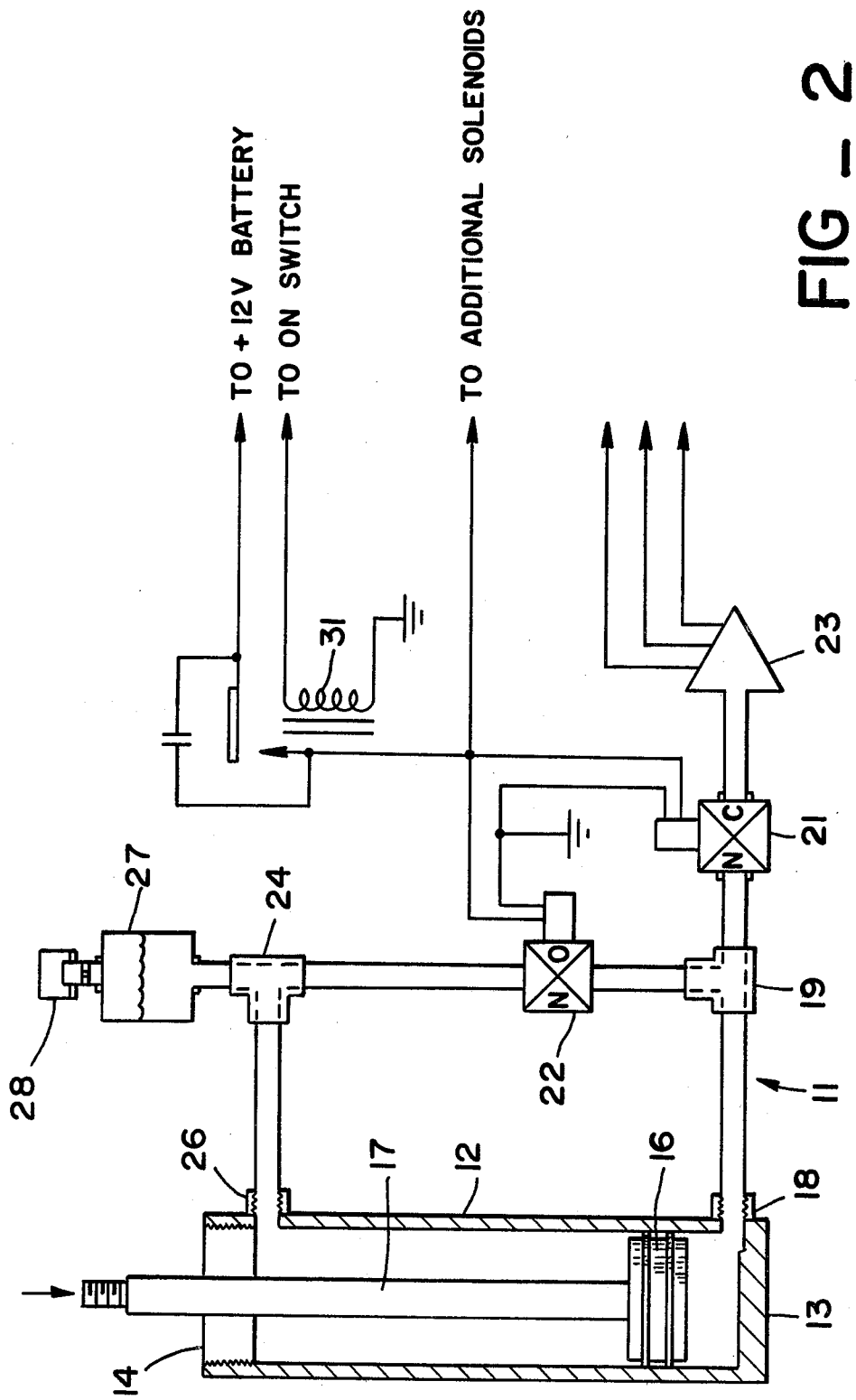

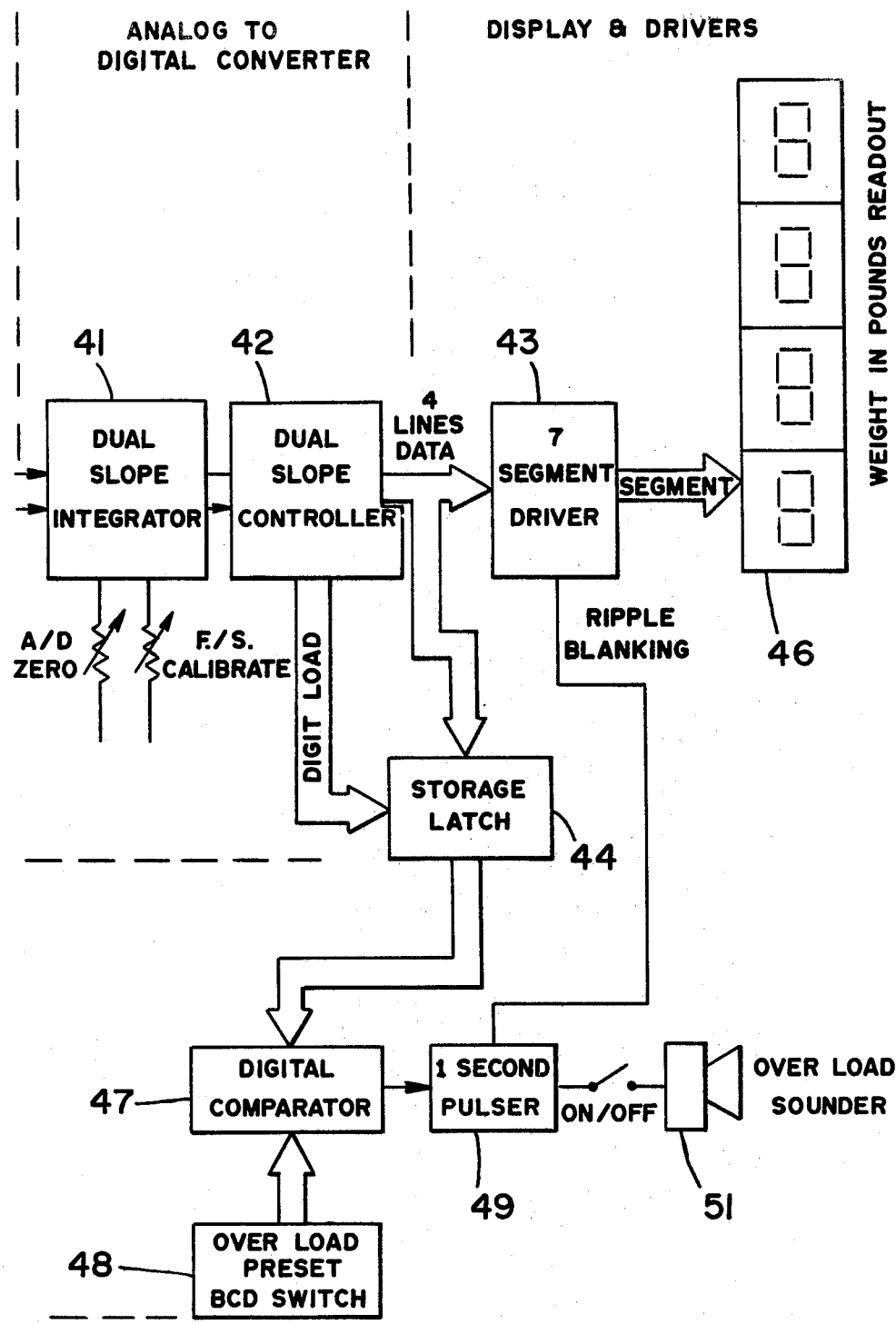
FIG _ 3

VEHICLE LOAD MONITORING SYSTEM

BACKGROUND OF THE INVENTION

Conveniently determining the weight of a cargo load on a commercial vehicle has been a problem since horse drawn wagons delivered goods from producer to user. As time has passed, the carriers have become motorized and substantially larger in size, and their load carrying capacity has increased concomitantly.

The cost of delivering a load for commercial purposes is assessed to the customer according to the weight of the load and the distance it must travel. Since a truck cargo may consist of a plurality of individual sub-loads for many customers, a single load for a single customer, or a combination thereof, every sub-load and total load must be weighed and recorded for billing purposes. Due to the fact that trucks rarely are equipped with any weighing device for this purpose, the trucker or carrier must rely on other parties to provide weighing facilitities or weighing calculations for the loads being transported. For example, some shippers provide scale facilities at their loading docks, and a trucker must rely upon the accuracy of the scales for the load data. Alternatively, a trucker may rehandle the cargo at a distribution point where weighing procedures can be repeated and verified. In a further alternative, a trucker may drive to a weigh station or highway scales to weigh the entire truck after each shipment is loaded onto or removed from the truck. In this manner the net change in weight of the entire truck may be ascertained and ascribed to a particular load.

It may be appreciated that the amount of driver's time and vehicle time which is required to attain the requisite weight information is enormous, and the cost of this time is great. Ironically, though, even with the enormous time spent and the cost incurred, the weighing system currently in place often produces erroneous weights which result in inaccurate calculations and erroneous freight charges.

In addition to the direct revenue problems which arise from the current difficulties in obtaining accurate load weight information, the indirect costs of these system errors may be almost as great. For example, overloading of a commercial draft vehicle causes stress on vital components of the vehicle, such as drive trains, brakes, springs, tires, and the like, which are beyond the design tolerances of these parts. As a result, overloading of a vehicle may seriously shorten the working life span of the vehicle and result in higher replacement costs to the vehicle operator. An overload commercial vehicle may also comprise a threat to the public safety when operated on the highways, due to its reduced ability to brake from high speeds or to negotiate corners and the like.

Furthermore, overloaded commercial vehicles are a significant factor in the deterioration of existing highways. Whenever paved roads are constructed, they are designed for specific maximum tolerances in pounds per square inch of load applied to the roadway surface per vehicle tire. When these designs parameters are exceeded by an overloaded vehicle, deterioration of the roadway is accelerated markedly. Even with highway check stations and special equipment carried by highway patrol officers, only a small percentage of overloaded vehicles is detected and cited.

SUMMARY OF THE PRESENT INVENTION

The present invention generally comprises a system mounted on a vehicle for determining the load carried by that vehicle. The device overcomes the problems normally associated with determining the weight of a vehicle load, as described in the previous section, and obviates the problems caused by overloading of commercial vehicles. The present invention further lends great assistance to law enforcement agencies in determining compliance with vehicle load regulations through the inclusion of a standard weights and measures identification and seal which prevents tampering with the system once it is installed on a vehicle.

The system for monitoring the load carried by a vehicle includes a plurality of load cells, each extending between the load bed and the unsprung portion of the vehicle suspension. Each load cell includes an hydraulic cylinder which generates an hydraulic force corresponding to the load applied thereto. A pressure transducer is connected to each hydraulic cylinder, and the outputs of all the transducers are summed and fed to an auto zeroing system. The output of this system is connected to an A/D converter, and thence to a visual display. The A/D converter output is also fed to a digital comparator which is connected to a BCD switch set to an overload level. If the load exceeds the BCD input, an overload alarm is sounded and the display flashes.

BRIEF DESCRIPTION OF THE DRAWING

FIG. 1 is a schematic diagram of the load cell portion and the summing and auto zero portion of the vehicle load monitoring system of the present invention.

FIG. 2 is a schematic depiction of the load cell portion of the vehicle load monitoring system of the present invention.

FIG. 3 is a block diagram of the A/D converter portion, the display portion, and the alarm portion of the vehicle load monitoring system of the present invention.

DESCRIPTION OF THE PREFERRED EMBODIMENT

The present invention is generally characterized as a system for measuring and monitoring the load which is applied to or carried by a commercial freight vehicle. With reference to FIGS. 1 and 2, the system includes a plurality of load cells 11 which are secured to and carried by the vehicle to be monitored. The load cells extend between the load carrying bed, tank, or the like of the drayage vehicle, and a portion of the unsprung suspension of the vehicle. For example, the load cells may be distributed about the underside of the load bed of a truck, with the measuring elements of each load cell extending between the truck bed and one end of each axle of the truck.

With reference to FIG. 2, each load cell 11 includes an hydraulic cylinder 12 which is closed at one end 13 and sealed at the other end 14. A piston 16 is disposed in the bore of the cylinder 12, and a piston rod 17 extends outwardly from the piston through the sealed end 14. It may be appreciated that the cylinder 12 may be secured to the vehicle load bed and the piston rod 17 joined to the unsprung portion of the suspension, or vice versa.

The end 13 of the hydraulic cylinder 12 is provided with a port 18 which is connected to a Tee connector 19. One branch of the Tee connector 19 is joined to a normally closed solenoid valve 21, while the other branch of the Tee is connected to a normally open solenoid valve 22. The normally closed valve 21 is in turn connected to a pressure transducer 23. The normally open valve 22 is connected to another Tee 24. One branch of the Tee 24 is joined to a port 26 which is provided in the end 14 of the cylinder 12, while the other branch of the Tee 24 is connected to an hydraulic fluid reservoir 27. The reservoir 27 is provided with a low flow air valve and filter assembly 28 which is open to ambient air pressure.

All of the solenoid valves 21 and 22 of all of the load cells 11 are connected to an operating relay 31. The relay 31 is connected between the 12 volt DC vehicle electrical system and an on-off switch which is used to power the relay 31 and actuate all of the solenoids simultaneously. When the system is off and the solenoid valves are in their quiescent state, valve 21 is closed and valve 22 is open. As a result, hydraulic fluid which is displaced from the cylinder chamber at the end 13 is permitted to flow through the valve 22 and the Tee 24 and back into the cylinder 12 through the port 26. Thus the hydraulic fluid is displaced through a closed loop, and the load cell acts merely as a shock absorber (mechanical resistance). No hydraulic pressure is applied to the transducer 23, due to the fact that the valve 21 is normally closed.

When the relay 31 is actuated, valve 22 closes and valve 21 opens. The closed fluid circuit through valve 22 is interrupted, and the hydraulic pressure created by displacement of the piston 16 in response to a load applied to the bed of the truck is conducted through the open valve 21 to the pressure transducer 23. However, no hydraulic fluid flow takes place, nor is any displaced. The transducer 23 in turn produces an analog signal representing the hydraulic pressure applied thereto.

The analog pressure signal from each of the load cells 11 is passed through a respective adjustable calibrating resistor 31, and thence is connected to one input of an operational amplifier 32. The op amp 32 is configured in the inverting summing mode. Resistor 33 is connected between the output and input of the op amp 32 in feedback configuration to set the gain of the amplifier at 1/159 of the voltage input. This scaling factor calibrates the voltage of the load cell (2.5–12.5 VDC) to the input of the A/D converter (0–2.000 VDC).

The invention also includes an auto-zero system which automatically re-zeros the reading of the system every time the system is initially actuated. The auto-zero configuration includes a comparator 34 which receives the output of the summing amplifier 32 and in turn provides an output which operates a D/A clock control 36. The clock control 36 produces a regular digital pulse train which is fed in turn into a D/A converter 37. The D/A converter 37 produces an increasing ramp voltage in response to each pulse received from the clock control 36. The increasing ramp voltage of the converter 37 is conducted to the positive input of the summing amplifier 32. When the system is first turned on, the clock control 36 begins to operate and to generate an increasing ramp voltage in the converter 37. The comparator 34 continues to operate the clock control 36 until the differential in the ramp voltage and the reference voltage applied to the comparator 34 surpasses 2.5 volts. At this point the comparator output deactuates the clock control 36, and the digital pulse train emanating therefrom ceases. The voltage output of the D/A converter 37 remains at the level which triggered the comparator 34 to shut off, and this level comprises the new zero calibration for the system. The auto-zeroing system overcomes load calculation errors by equating the total pressure transducer output to zero at the instant the system is first actuated. Thus residual hydraulic pressures in the load cells, due to sticking pistons or rods, thermal effects, and the like, cannot affect the accuracy of the overall system.

The invention also includes an analog to digital converter portion, comprising a Motorola two chip set which includes a dual slope integrator 41 interconnected with a dual slope controller 42. The inputs to the integrator 41 comprise the summed signal from the op amp 32, and the zeroing calibration signal from the D/A converter 37. Thus the integration is performed with respect to the new zero voltage level. The two chip A/D converter set resolves the inputs to 4 ½ digits with an accuracy of 0.05%, and produces a BCD multiplex output.

The BCD output of the dual slope controller 42 is fed to a four digit LED display 46 through an equal number of seven segment driver circuits 43, as shown in FIG. 3. The display 46 thus provides a visual indication of the load increment added to the vehicle after the system is actuated and zeroed. The digital output of the dual slope controller 42 is also fed to a storage latch 44, and thence to a digital comparator 47. Also connected to the digital comparator 47 is a set of three BCD switches 48 which are used to pre-set a maximum vehicle load figure beyond which the vehicle is overloaded. When the digital number in the latch 44 exceeds the number set in the switches 48, the digital comparator 47 produces an actuating signal which actuates a CMOS astable multivibrator 49. The output of the multivibrator 49, which comprises a pulse train having a one second period, is fed to the seven segment drivers 43 to cause the display 46 to flash on and off at one second intervals. The output of the multivibrator 49 is also fed to an audio alarm 51 to alert the vehicle operator to the overload condition and direct his or her attention to the weight readout display 46.

It should be noted that any number of load cells may be employed with the circuitry of the present invention, due to the fact that the use of a summing amplifier facilitates the addition of load cells as needed. Furthermore, the load cells may be employed not only between the sprung and unsprung portions of the vehicle itself, but also may be used in the mounting assembly of a tractor which supports a trailer load.

The general operating scheme of the present invention is to first switch on the system, causing the valves 21 and 22 of each load cell to actuate, while at the same time the auto zeroing loop is going through its zeroing subroutine. In a matter of a second or two the system is zeroed, and the valves are actuated, and the vehicle is ready to receive its additional load. When the load is placed on the bed of the vehicle, the additional force created thereby will create proportional hydraulic pressure in the end 13 of each cylinder, and this pressure will create an analog pressure signal as described in the foregoing. The analog pressure signals are summed and compared to the auto zero voltage level, and the difference therebetween is converted to a digital number by the A/D converter set 41 and 42. This number is displayed by the display 46, providing the truck or vehicle operator with an immediate read-out of the weight which has been added to the vehicle. Thus the vehicle operator may know immediately what load has been added to the vehicle, without recourse to reweighing of the vehicle or individual weighing procedures for each load prior to being received.

It may be noted that the incremental weight additions displayed by the LED display 46 may also be entered in a memory system which retains this information even after the load monitoring system is deactuated. Thus the present invention easily may be used to monitor the total weight of the loaded vehicle, as well as the additional weights caused by individual received loads. The invention and its memory system may also be provided with a tamper-proof case and a seal of accuracy secured thereto by a competent governmental agency, as is provided for other commercial weighing devices.

I claim:

1. A system for monitoring the load added to a draft vehicle, including at least one load cell extending between the load carrying portion and the ground engaging portion of the vehicle, said load cell including passive hydraulic means for generating an hydraulic pressure corresponding to the load applied to said load carrying portion, said hydraulic means including an hydraulic cylinder having opposed chambers at either side of a translatable piston, said piston and said cylinder being secured to respective ground engaging and load carrying portions of said vehicle, one of said chambers being compressed by a load applied to load carrying portion, a closed hydraulic loop connecting said chambers, first valve means for selectively blocking said closed loop, second valve means connected to said one chamber, pressure transducer means connected to said second valve means for generating an analog signal representing the hydraulic pressure in said one chamber when said one chamber is compressed, said first valve means is actuated to block said closed loop, and said second valve means is selectively opened, means for converting said analog signal to a digital signal, and means for displaying said digital signal.

2. The system of claim 1, wherein said means for converting said analog signal includes a dual slope integrator-controller and further including auto-zeroing means interposed between said pressure transducer means and said integrator-controller.

3. The system of claim 2, wherein said auto-zeroing means includes a summing amplifier connected to receive said analog signal, and voltage comparator means connected at one input to receive the summed output signal from said summing amplifier.

4. The system of claim 3, wherein the output of said comparator means is connected to actuate a digital pulse train source.

5. The system of claim 4, wherein the output of said digital pulse train source is connected to a D/A converter to generate a rising ramp voltage is response to receiving consecutive pulses from said source, said rising ramp voltage being connected to the other input of said voltage comparator means, whereby said voltage comparator means deactuates said digital pulse train source when said ramp voltage level equals said analog signal.

6. The system of claim 5, wherein said integrator controller receives said summed output signal and said ramp voltage level to integrate the former with respect to the latter.

7. The system of claim 6, further including a plurality of said load cells, each producing an analog signal, all of said analog signals being connected to said summing amplifier.

8. The system of claim 7, further including digital comparator means for receiving the digital output of said integrator-controller, and a plurality of BCD switches connected to said digital comparator means, said digital comparator means generating an alarm actuating signal when said digital output exceeds the setting of said BCD switches.

9. The system of claim 1, wherein said display means includes a plurality of seven segment numerical displays.

10. The system of claim 1, further including means for actuating said first and second valve means substantially simultaneously.

* * * * *